United States Patent
Kim et al.

(10) Patent No.: US 9,609,392 B2
(45) Date of Patent: Mar. 28, 2017

(54) DISPLAY APPARATUS FOR ARRANGING CONTENT LIST AND CONTROLLING METHOD THEREOF

(71) Applicant: SAMSUNG ELECTRONICS CO., LTD., Suwon-si (KR)

(72) Inventors: Hyun-ki Kim, Seongnam-si (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 14/522,725

(22) Filed: Oct. 24, 2014

(65) Prior Publication Data

US 2015/0205458 A1 Jul. 23, 2015

(30) Foreign Application Priority Data

Jan. 20, 2014 (KR) ........................ 10-2014-0006483

(51) Int. Cl.
| | | |
|---|---|---|
| G06F 3/048 | (2013.01) | |
| H04N 21/485 | (2011.01) | |
| H04N 21/431 | (2011.01) | |
| H04N 21/45 | (2011.01) | |
| H04N 21/475 | (2011.01) | |

(52) U.S. Cl.
CPC ....... *H04N 21/485* (2013.01); *H04N 21/4312* (2013.01); *H04N 21/4532* (2013.01); *H04N 21/4755* (2013.01)

(58) Field of Classification Search
CPC .......................... H04N 21/4312; G06F 3/0482
USPC .......................................................... 715/765
See application file for complete search history.

(56) References Cited

U.S. PATENT DOCUMENTS

| | | | | |
|---|---|---|---|---|
| 8,340,726 | B1* | 12/2012 | Fujisaki | H04M 19/04 345/168 |
| 8,489,990 | B2* | 7/2013 | Radloff | G11B 27/105 369/30.08 |
| 8,516,373 | B2* | 8/2013 | Miyazaki | H04N 5/44582 715/716 |
| 8,717,301 | B2* | 5/2014 | Sakata | G06F 3/0488 345/173 |
| 2007/0106949 | A1* | 5/2007 | Narita | G06F 3/0482 715/757 |
| 2008/0202823 | A1* | 8/2008 | Won | G06F 3/0485 178/18.01 |
| 2009/0006993 | A1* | 1/2009 | Tuli | G06F 3/0482 715/764 |
| 2009/0138821 | A1* | 5/2009 | Shinokura | G06F 3/0482 715/810 |

(Continued)

FOREIGN PATENT DOCUMENTS

| | | |
|---|---|---|
| KR | 10-2009-0057568 A | 6/2009 |
| KR | 10-2012-0007194 A | 1/2012 |

*Primary Examiner* — William Titcomb
(74) *Attorney, Agent, or Firm* — Sughrue Mion, PLLC

(57) ABSTRACT

A controlling method for arranging a content list of a display apparatus is provided. The method includes storing at least one content selected by a user, displaying a content list including the at least one content, and in response to a location fixation command related to one of the at least one content included in the content list being input, fixing a location of the selected at least one content on the content list. Accordingly, the content list can be arranged efficiently.

17 Claims, 8 Drawing Sheets

(56) References Cited

U.S. PATENT DOCUMENTS

| | | | |
|---|---|---|---|
| 2009/0165045 A1* | 6/2009 | Stallings | G06F 3/0482 725/39 |
| 2009/0172598 A1* | 7/2009 | Yamanaka | G06F 3/0482 715/841 |
| 2009/0327892 A1* | 12/2009 | Douillet | H04L 12/2812 715/717 |
| 2010/0058216 A1* | 3/2010 | Yoon | G06F 3/0482 715/769 |
| 2010/0162168 A1* | 6/2010 | Lee | G06Q 10/107 715/821 |
| 2011/0072373 A1* | 3/2011 | Yuki | G06F 3/04817 715/764 |
| 2011/0252346 A1* | 10/2011 | Chaudhri | G06F 3/04817 715/765 |
| 2012/0054794 A1* | 3/2012 | Kim | G06F 3/0346 725/38 |
| 2012/0072869 A1* | 3/2012 | Odagawa | G06F 3/0482 715/810 |
| 2013/0067328 A1* | 3/2013 | Salyards | G06F 17/30769 715/716 |
| 2013/0070164 A1* | 3/2013 | Ozaki | G06F 3/0482 348/739 |
| 2013/0191783 A1* | 7/2013 | Sugita | G06F 3/0482 715/810 |

* cited by examiner

DISPLAY APPARATUS FOR ARRANGING CONTENT LIST AND CONTROLLING METHOD THEREOF

CROSS-REFERENCE TO RELATED APPLICATIONS

This application claims priority from Korean Patent Application No. 10-2014-0006483, filed in the Korean Intellectual Property Office on Jan. 20, 2014, the disclosure of which is incorporated herein by reference in its entirety.

BACKGROUND

1. Field

Apparatuses and methods consistent with exemplary embodiments relate to a display apparatus which arranges a content list and a controlling method thereof, and more particularly, to a display apparatus which allows a user to find a desired content easily even if the location of contents change in a list of user's preferred contents and a controlling method thereof.

2. Description of the Related Art

Recently, a display apparatus has become more multi-functional and sophisticated and thus, a digital-based digital broadcasting technology which goes beyond the existing analog-based broadcasting has been developed and utilized. Accordingly, various types of contents services, such as real-time broadcasting, Contents on Demand (CoD), games or news may be provided to a user not only through the existing electric wave or wired cable medium, but also through an Internet network in each household. In addition, a display apparatus may receive and display various types of content services.

The examples of a content providing service using an Internet network include Internet Protocol TV (IPTV). The IPTV transmits various information services, video contents, broadcasting, etc. to the display apparatus of a user using an Internet network.

Recently, the number of content providers who provide such contents and the number of broadcast channels (ground wave and cable broadcasting) have been increasing exponentially, and a display apparatus may be provided with contents through numerous channels.

Once a user registers a received content as a preferred content, the preferred contents are collected in a storage space of a display apparatus, which allows the user to access the preferred contents swiftly. However, as new contents are added accumulatively by the user, the user may not access a desired content immediately.

In addition, when a new content is added to a list of preferred contents by a user, the new content may belong to the list as the very first or the very last preferred content. As new contents are added continuously, the list of preferred contents becomes longer. As a result, the user may have difficulties in finding a desired content as the location of the contents change due to the newly-added contents.

In other words, a user may experience inconvenience when trying to find the previously-added content in the list of preferred contents.

Accordingly, a new method for arranging a list of preferred contents is required.

SUMMARY

An aspect of the exemplary embodiments relates to a display apparatus which allows a user to find a desired content easily even if the location of the existing contents change due to newly-added contents in a preferred content list, and a method for controlling a display apparatus thereof.

A method for controlling a display apparatus according to an exemplary embodiment, the method includes storing at least one content selected by a user, displaying a content list including the at least one content, and in response to a location fixation command related to one of the at least one content included in the content list being input, fixing a location of the selected at least one content on the content list.

The fixing the location of the selected at least one content may include, in response to the at least one content being pressed via the input of the user for a predetermined time, displaying a setting menu regarding the at least one content, and after displaying the setting menu, receiving a location fixation command by selecting a location fixation icon included in the setting menu.

The setting menu may include a plurality of control command icons related to the late one content, and the plurality of control commands may include a location fixation command icon to fix a location related to one of the at least one content included in the content list.

The location fixation command may be input through at least one from among a user motion, a selection of icon, and a user voice.

The method may further include, in response to a new content being added in the content list after the location fixation command is input, fixing a location of the at least one content for which the location fixation command is input from among existing contents included in the content list, and changing a location of remaining contents from among the existing contents or deleting the remaining contents from the content list.

A display apparatus according to an exemplary embodiment includes a display configured to display a content list including at least one content, an input part configured to receive a location fixation command, and a controller configured to, in response to a location fixation command related to one from among the at least one content included in the content list being input, fix a location of the selected at least one content on the content list. The display apparatus may further comprise a storage configured to store the at least one content selected by a user.

The controller, in response to the at least one content being pressed via the input of the user for a predetermined time, may control the display to display a setting menu related to the at least one content, and the controller, in response to a location fixation icon being selected through the input part after the setting menu is displayed, may fix a location of the selected icon.

The setting menu includes a plurality of control command icons related to the at least one content, and the plurality of control commands may include a location fixation command icon to fix a location related to one of the at least one content included in the content list.

The location fixation command may be input through at least one from among a user motion, a selection of icon, and a user voice.

The controller, in response to a new content being added in the content list after the location fixation command is input, may fix a location of the at least one content for which the location fixation command is input from among existing contents included in the content list, and change a location of remaining contents from among the existing contents or delete the remaining contents from the content list.

A method for controlling a display apparatus according to an exemplary embodiment includes receiving a user command to display a content list including a plurality of contents and displaying the content list including the plurality of contents, and the displaying comprises, in response to view mode of the content list being set to a preset mode by a user, arranging and displaying the plurality of contents according to a type of contents.

The displaying may include, in response to arranging and displaying the plurality of contents by the type of contents, determining the type of the plurality of contents according to an input of the user.

A display apparatus according to an exemplary embodiment includes a display configured to display a content list including a plurality of contents, an input part configured to receive a user command to set a view mode of the content list to a preset mode, and a controller, in response to the view mode of the content list being set to the preset mode through the input part, controls the display to arrange and display the plurality of contents by a type of contents.

The controller, in response to determining the type of the plurality of contents according to an input of the user, may control the display to display the plurality of groups distinctively.

According to the above various exemplary embodiments, a user may find a desired content easily even if the location of the existing contents changes in the list of preferred contents.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

It should be observed that the method steps and system components have been represented by conventional symbols in the figure, showing only specific details which are relevant for an understanding of the present disclosure. Further, details that may be readily apparent to a person ordinarily skilled in the art may not have been disclosed. In the present disclosure, relational terms such as first and second, and the like, may be used to distinguish one entity from another entity, without necessarily implying any actual relationship or order between such entities.

Figure 1:
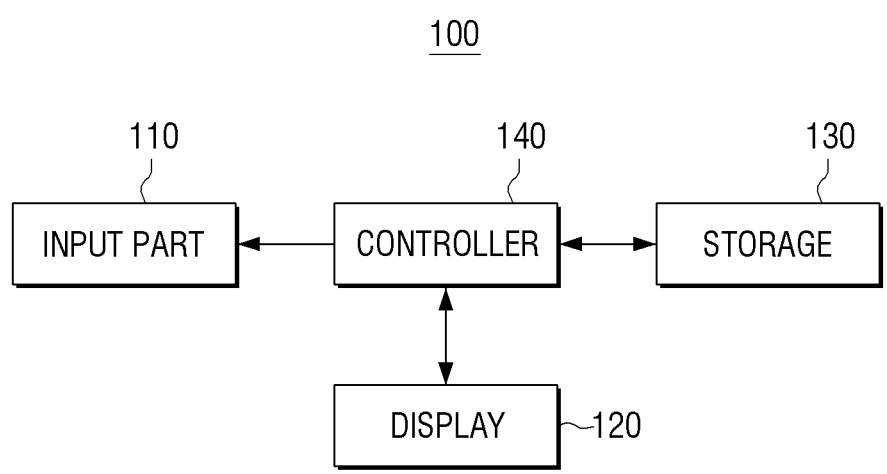
FIG. 1 is a block diagram illustrating configuration of a display apparatus according to an exemplary embodiment.

FIG. 1 is a block diagram illustrating a configuration of a display apparatus 100 according to an exemplary embodiment. As illustrated in FIG. 1, the display apparatus 100 includes an input part 110, a display 120, a storage 130, and a controller 140.

The display apparatus 100 may be a display apparatus such as a smart television, but this is only an example. The display apparatus 100 may be realized as a desktop PC, a tablet PC, a smart phone, etc., and may also be realized as another input apparatus of a voice input apparatus. In this case, the display apparatus 100 may receive a user command through the input part 100 to store a content or to add the content in a content list. Herein, the display apparatus 100 may display the content list on the display 120.

The input part 110 receives a user command to control the overall operations of the display apparatus 100. The input part 110 may be realized as a touch panel, but this is only an example. The input part 110 may be realized as another input apparatus to control the display apparatus, such as a remote controller, a pointing device, etc.

In particular, the input part 110 may receive a user command to add contents or to arrange a list of contents.

The display 120 displays an image content under the control of the controller 140. In an exemplary embodiment, the display 120 may display a content list, and in response to a location fixation command with respect to at least one content included in the content list being input through the input part 110, may fix the location of the selected content on the content list.

In addition, in response to at least one content included in a content list being input through the input part 110 for a predetermined time by a user, a setting menu regarding the content may be displayed through the display 120. In this case, the setting menu regarding the input content may include a location fixation icon from among a plurality of control command icons, and the display 120 may display the location fixation icon on one side of the content of which a location is fixed.

The storage 130 stores various modules to drive the display apparatus 100. The storage 130 stores a content added by a user, and the controller 140 displays the added content through the display 120.

In an exemplary embodiment, the storage 130 may store at least one of a command regarding control of power of a display apparatus, a command regarding channel control, a command regarding volume control, and a predetermined time for receiving a user input. The commands of the display apparatus 100 are not limited to the above commands, and various commands may be stored by a user.

The controller 130 controls overall operations of the display apparatus 100.

In particular, in an exemplary embodiment, a control command corresponding to a user command input through the input part 110 is performed. The controller 140 may store at least one content selected by a user in the storage 130, and may display a content list including at least one content on the display 120.

In addition, in response to a location fixation command regarding at least one content included in the content list being input through the input part 110 by a user, the controller 140 may fix the location of the selected content on the content list.

Specifically, in response to at least one content being pressed by a user through the input part 110 for a predetermined time, the controller 140 may display a setting menu regarding the at least one content on the display 120. The controller 140 may display the setting menu and then, in response to a location fixation icon included in the setting menu being selected by the user, may fix the location of the selected content.

The setting menu according to an exemplary embodiment includes a plurality of control command icons related to at least one content, and the plurality of control command icons may include a location fixation command icon to fix the location of at least one content included in the content list.

In addition, the controller 140 may receive a user command in the form of at least one of a user motion, selection of icon, and a user voice through a motion input part, the input part 110, and a voice input part, respectively, and may execute the user command.

In another exemplary embodiment, the controller 140 may receive a user command to display a content list including a plurality of contents through the input part 110.

In response to a view mode of the content list being set to a group mode by a user, the controller 130 may arrange and display a plurality of contents by type according to a user input.

Hereinafter, the display apparatus 100 according to various exemplary embodiments will be described with reference to FIGS. 2 to 6.

Figure 2:
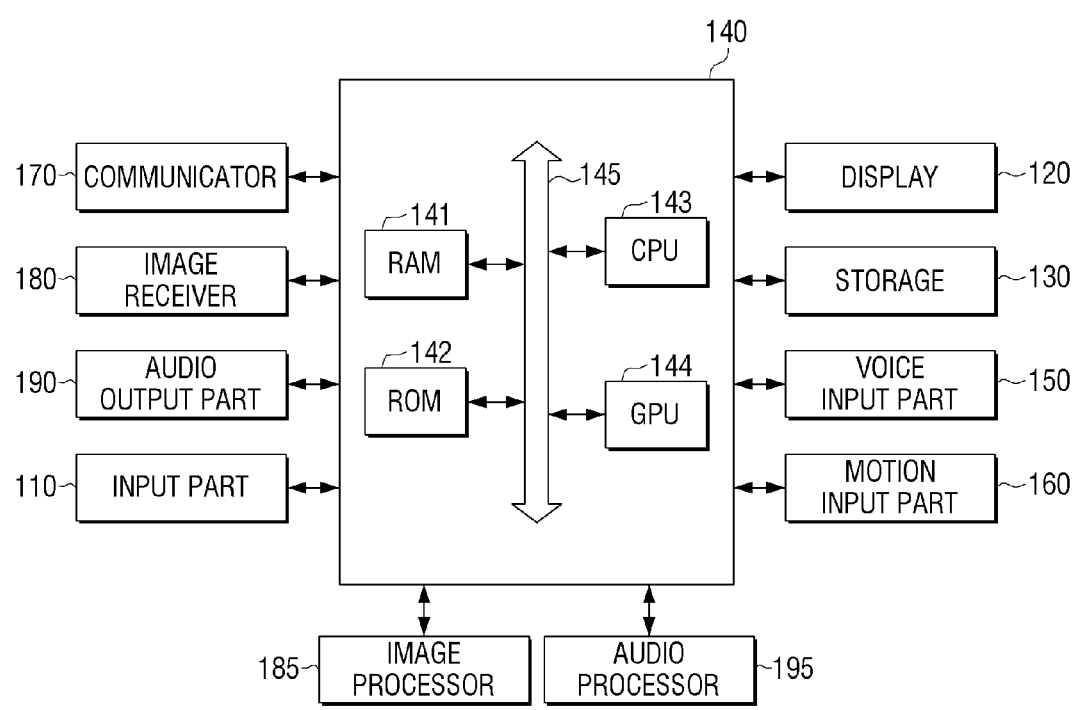
FIG. 2 is a block diagram illustrating configuration of a display apparatus in detail according to an exemplary embodiment.

FIG. 2 is a block diagram illustrating a configuration of the display apparatus 100 in detail according to an exemplary embodiment. As illustrated in FIG. 2, the display apparatus 100 includes the display 120, the storage 130, the controller 140, a RAM 141, a ROM 142, a CPU 143, a GPU 144, a bus 145, a voice input part 140, a motion input part 160, a communicator 170, an image receiver 180, an audio output part 190, an input part 110, an image processor 185, and an audio processor 195.

Meanwhile, FIG. 2 illustrates various components comprehensively, assuming that the display apparatus 100 is an apparatus having various functions such as a communication function, a broadcast receiving function, a video play function, a display function, etc. Accordingly, depending on exemplary embodiments, a part of the components illustrated in FIG. 2 may be omitted or changed, or other components may be further added.

The input part 110 receives a user command to control the overall operations of the display apparatus 100. In particular, the input part 110 may receive a user command to execute a voice input mode, a user command to select a service, etc.

Meanwhile, the input part 110 may be realized as a touch panel, but this is only an example. The input part 110 may be realized as other various input apparatuses which can control the display apparatus 100, such as a remote controller, a pointing device, etc.

As described above, the display 120 displays at least one of a video frame which is generated as the image processor 185 processes image data received from the image receiver 180 and various screens generated by a graphic processor (not shown).

Specifically, the display 120 displays image contents processed by the image processor 185 under the control of the controller 140. In particular, the display 120 displays a content list, and in response to a location fixation command regarding at least one content included in the content list being input through the input part 110, the display 120 may fix the location of the selected content on the content list.

The storage 130 stores various modules to drive the display apparatus 100. The storage 130 may store contents added by a user, and may add or store the contents in the content list. According to an exemplary embodiment, the storage 130 may store at least one of a command regarding control of power of a display apparatus, a command regarding channel control, a command regarding volume control, a predetermined time for receiving a user input, and a setting menu. The predetermined time stored in the storage 130 may be stored according to a user input. According to an exemplary embodiment, the predetermined time may be set to be more than 3 seconds and less than 5 seconds, but is not limited thereto. The command of the display apparatus 100 is not limited to the above examples, and may vary.

The voice input part 150 receives a user voice. The voice input part 150 may receive a user voice directly through a microphone included therein, or may receive a user voice through a microphone connected to the display apparatus 100 via cable or wirelessly. According to an exemplary embodiment, a command to fix the location of a content may be received through the voice input part 150.

The motion input part 160 receives an image signal (for example, successive frames) which photographs a user motion and recognizes the user motion. In this case, the motion input part 160 may include a camera and a motion recognition module. The camera may be configured to be integrated with the display apparatus 100, but this is only an example. The display apparatus 100 may be separate from the display apparatus 100, and may be connected to the display apparatus 100 via cable or wirelessly.

The communicator 170 performs communication with various types of external apparatuses according to various types of communication methods. The communicator 170 may include a WiFi chip, a Bluetooth chip, a Near Field Communication (NFC) chip, and a wireless communication chip. Herein, the WiFi chip, the Bluetooth chip, and the NFC chip perform communication according to a WiFi method, a Bluetooth method and an NFC method, respectively. The NFC chip represents a chip which operates according to an NFC method which uses 13.56 MHz band among various RFID frequency bands such as 135 kHz, 13.56 MHz, 433 MHz, 860~960 MHz, 2.45 GHz, and so on. In the case of the WiFi chip or the Bluetooth chip, various connection information such as SSID and a session key may be transmitted/received first for communication connection and then, various information may be transmitted/received. The wireless communication chip represents a chip which performs communication according to various communication standards such as IEEE, Zigbee, $3^{rd}$ Generation (3G), $3^{rd}$ Generation Partnership Project (3GPP), Long Term Evolution (LTE) and so on.

In an exemplary embodiment, the communicator 170 may receive content information and a desired content in an external server apparatus and store the same in the storage 130.

The image receiver 180 receives contents through various external sources. Specifically, the image receiver 180 may receive a broadcast content from an external broadcasting station, receive an image content from an external apparatus (for example, a DVD apparatus), and receive a streaming content from an external server.

The audio output part 190 outputs audio data of an image content. The audio output part 190 outputs not only various audio data processed by the audio processor 185 but also various alarm sounds or voice messages.

The image processor 185 processes image contents received from the image receiver 180 to be in the form of displayable data. The image processor 185 may perform various image processing with respect to image data, such as decoding, scaling, noise filtering, frame rate conversion, resolution conversion, etc.

The audio processor 195 processes audio data. The audio processor 195 may perform various processing with respect to audio data, such as decoding, amplification, noise filtering, etc. The audio data processed in the audio processor 195 may be output to the audio output part 190.

The controller 140 controls overall operations of the display apparatus 100 using various programs stored in the storage 130.

As illustrated in FIG. 2, the controller 140 includes a random access memory (RAM) 141, a read-only memory (ROM) 142, a main CPU 143, a graphic processor 144, and a bus 145. In this case, the RAM 141, the ROM 142, the main CPU 143, and the graphic processor 144 may be interconnected through the bus 145.

The ROM 141 stores a set of commands for system booting. If a turn-on command of the display apparatus 100 is input and thus, power is supplied, the main CPU 143 copies the O/S stored in the storage 130 in the RAM 141 according to a command stored in the ROM 142, and boots a system by executing the O/S.

The graphic processor 144 generates a screen including various objects such as an icon, an image, a text, contents, etc. using an operation part (not shown) and a rendering part (not shown).

The main CPU 143 accesses the storage 130, and performs booting using the O/S stored in the storage 130. In addition, the main CPU 143 performs various operations using various programs, contents, data, etc. stored in the storage 130.

In particular, the controller 140 may store at least one content selected by a user in the storage 130, and display a content list including at least one content in the display 120. The description regarding the operation of fixing the location of the preferred content which is displayed will be provided with reference to FIGS. 3 to 5.

Figure 3:
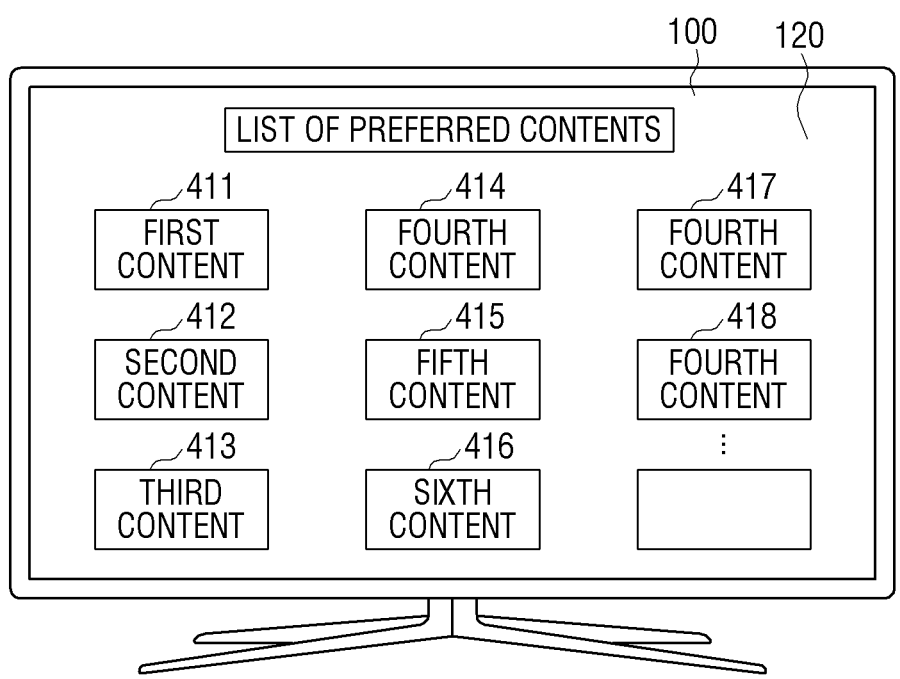
FIGS. 3 to 5 are views provided to explain an operation of fixing a location of a preferred content according to an exemplary embodiment.

For example, as illustrated in FIG. 3, the controller 140 may store at least one content selected by a user in the storage 130, and display the first content to the eighth content 411 to 418 through the display 120.

In addition, in response to a location fixation command related to one of the at least one content included in the content list being input by the user, the controller 140 may fix the location of the content selected on the content list. Specifically, in response to at least one content being pressed by the user through the input part 100 for a predetermined time, the controller 140 may display a setting menu regarding the at least one content on the display 120. The controller 140 may display the setting menu, and in response to a location fixation icon included in the setting menu being selected through the input part 110, may fix the location of the selected content.

Figure 4:
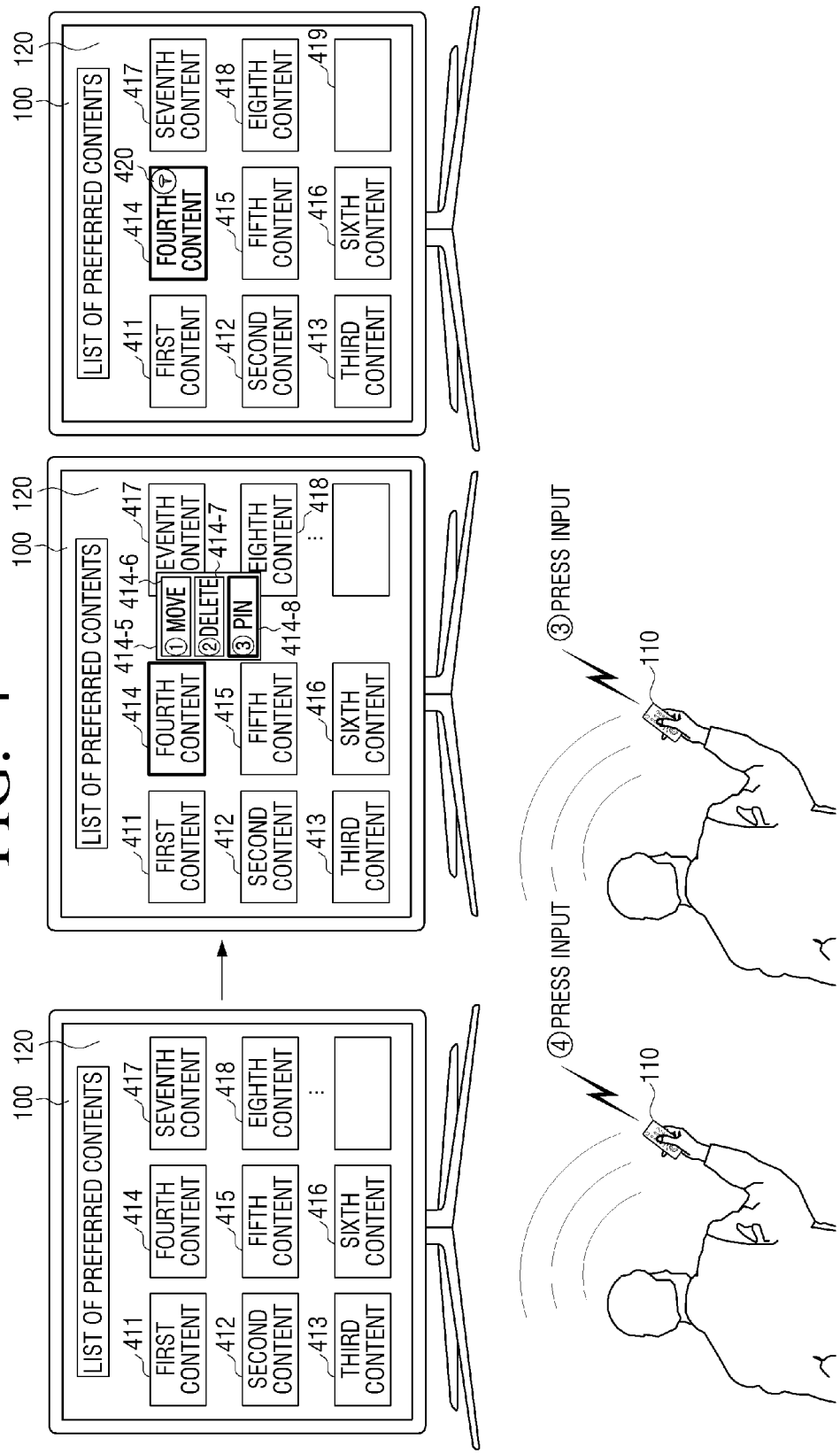

For example, as illustrated in FIG. 4, the controller 140 may store at least one content selected by the user in the storage 130, and may display the content list 411 to 418 again through the display 120. In response to a location fixation command related to at least one content included in the content list 411 to 418 being input, the controller 140 fixes the location of the content selected from the content list 411 to 418. Specifically, in response to content 4 (414) being input by the user through the input part 110 for a predetermined time, a setting menu 414-5 of the input content 4 is displayed. In this case, the predetermined time may be longer than 3 seconds and less than 5 seconds, and the predetermined time may be set by the user in various ways. In response to an input of '3' by the user through the input part 110 in order to select PIN 414-8 corresponding to '3' from among setting menus 414-6, 414-7, 414-8, the controller 140 fixes the location of the fourth content 414 which is input by the user. As illustrated in FIG. 4, a location fixation icon 420 is illustrated in the shape of pushpin, but may be realized in various ways.

The setting menu according to an exemplary embodiment includes a plurality of control command icons regarding at least one content, and a plurality of control commands may include a location fixation command icon to fix the location of one of the at least one content included in the content list.

As described above, the location fixation command may be input by selecting an icon through the input part 110, or may be input through a user motion through the motion input part 160 or through a user voice through the voice input part 150.

Figure 5:
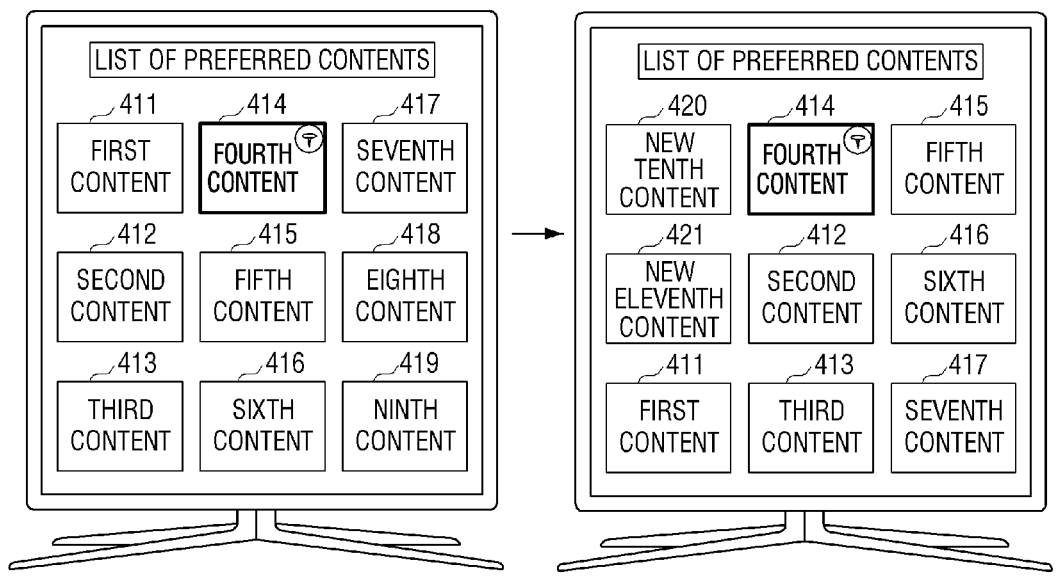

In response to a new content being added in the content list after the location fixation command is input, the controller 140 may fix the location of the content for which the location fixation command is input from among the existing contents included in the content list, and may change the location of the remaining contents or delete the remaining contents from the content list. For example, as illustrated in FIG. 5, in response to new contents 10, 11 (420, 421) being added in the content list 411 to 419 after a location fixation command related to the preferred content 414 displayed on the display 120 is input, the controller 140 may change the location of the remaining contents 411 to 417 other than the content 414 of which location is fixed from among the existing contents 411 to 419 included in the content list or may delete the remaining contents 411 to 417 from the content list (418, 419).

Figure 6:
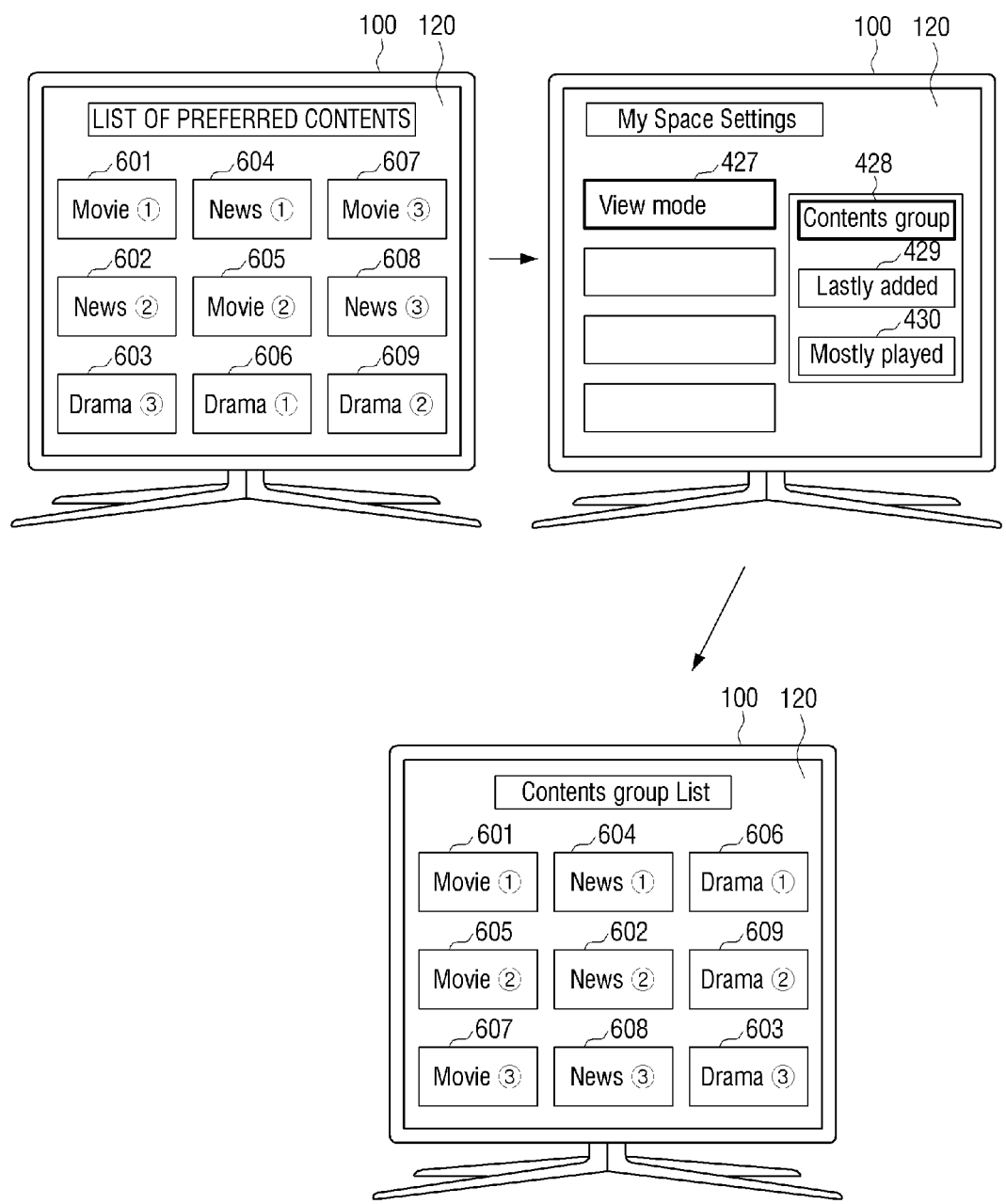
FIG. 6 is a view provided to explain an operation of displaying preferred contents by type according to an exemplary embodiment.

In another exemplary embodiment, the controller 140 may receive a user command to display a content list including a plurality of contents through the input part 110, and display the content list. In response to a content list view mode being set to a group mode by the user, the controller 140 may arrange and display the plurality of contents by the type of contents. For example, as illustrated in FIG. 6, after receiving a user command to display a content list 601 to 609 including a plurality of contents, the display apparatus 100 may display the content list 601 to 609 including a plurality of contents. In this case, in response to 'View mode' 427 being set by the user in the environment setting of the content list 601 to 609 and then, 'contents group' 428 being selected from among sub menus 428, 429, 430 of 'View mode' 427, the content list may be arranged by type. The contents may be arranged on the display 120 according to type of contents, for example, the contents may be arranged by movie 1, 2, 3 (601, 605, 607), news 1, 2, 3 (604, 602, 608), or drama 1, 2, 3 (606, 609, 603).

When the content list is arranged by type, the controller 130 may display the contents to be visually distinctive from each other using at least one of size, form, shape, and color.

Figure 7:
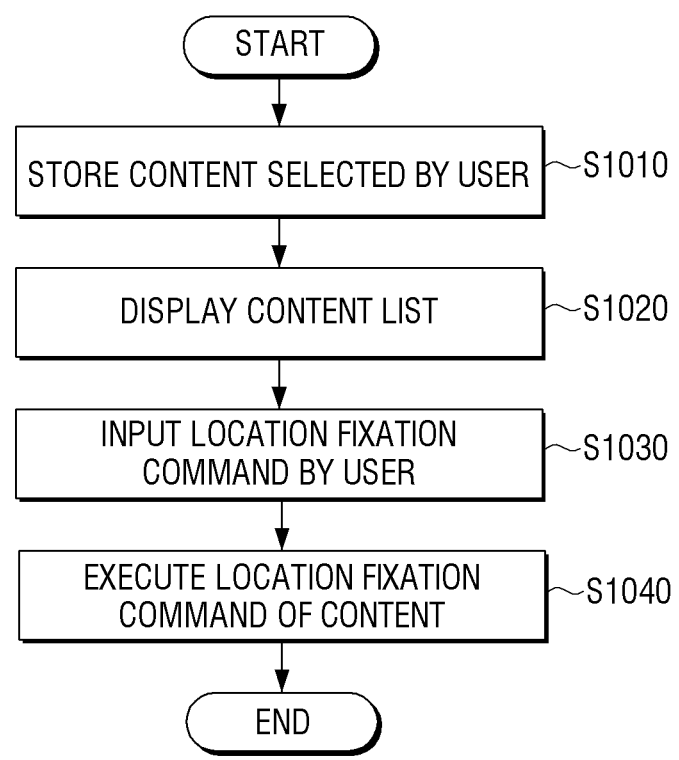
FIG. 7 is a flowchart provided to explain a method for fixing a location of a preferred content according to an exemplary embodiment.

FIG. 7 is a flowchart provided to explain a method for fixing a location of a preferred content according to an exemplary embodiment.

According to FIG. 7, the display apparatus 100 stores a content selected by a user. As described above, the content may be selected through the input part 110. The input part 110 may be a remote controller or other external devices.

In response to the content selected by the user being stored in the display apparatus 100 (S1010), a content list is displayed through the display 120 (S1020).

The display apparatus 100 receives a location fixation command from the user (S1030).

As described above, in response to a content being input from the user through the input part 110 for a predetermined time, a setting menu of the selected content may be displayed. The setting menu may include a plurality of control command icons, and a plurality of control commands may include a location fixation command icon to fix the location of one of the at least one content included in the content list.

After receiving a location fixation command from the user, the display apparatus 100 executes the location fixation command related to the content (S1040). In this case, in response to a new content being added in the content list, the location of the content for which the location fixation command is input from among the existing contents included in the content list may be fixed, and the location of the remaining contents except for the content of which location is fixed may change, or the remaining contents may be deleted from the content list. For example, as illustrated in FIG. 5, in response to new contents 10, 11 (420, 421) being added in the content list 411 to 419 after a location fixation related to regarding the preferred content 414 displayed on the display 120 is input, the controller 140 may change the location of the remaining contents 411 to 417 other than the content 414 of which location is fixed from among the existing contents 411 to 419 included in the content list or may delete the remaining contents 411 to 417 from the content list (418, 419).

Figure 8:
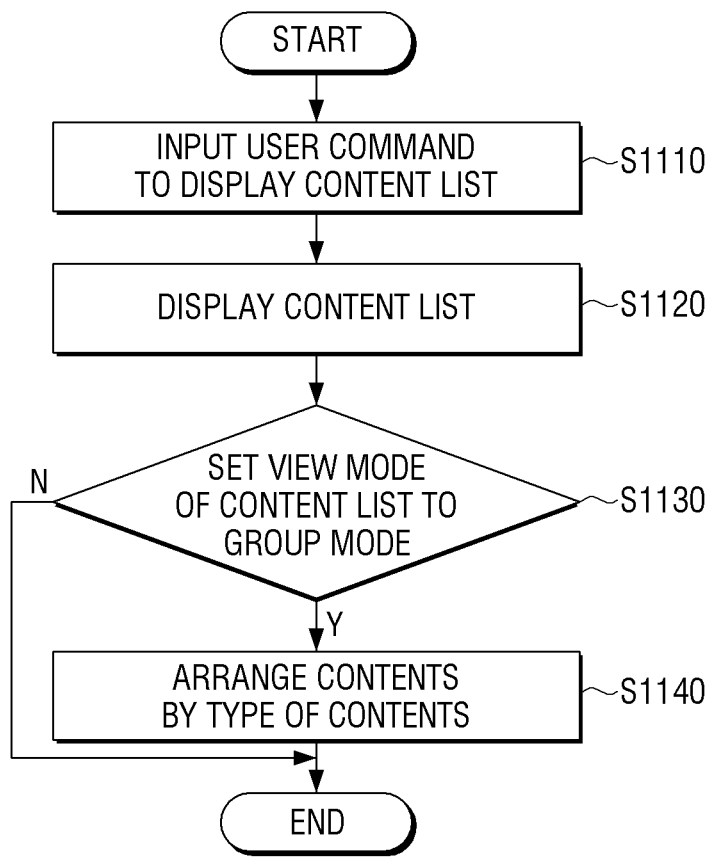
FIG. 8 is a flowchart provided to explain an operation of displaying preferred contents by type according to an exemplary embodiment.

FIG. 8 is a flowchart provided to explain an operation of displaying preferred contents by type according to an exemplary embodiment.

According to FIG. 8, the display apparatus 100 receives a user command to display a content list (S1110). As described above, after receiving the user command to display a content list, the display apparatus 100 displays a content list including a plurality of contents (S1120).

In response to a view mode of the content list being set to a group mode by the user (S1130-Y), the display apparatus 100 may arrange and display a plurality of contents by the type of contents (S1140). As described above, the type of a plurality of contents may be determined by a user, and when the content list is arranged by type, the display apparatus 100 may display the contents to be visually distinctive from each other using at least one of size, form, shape, and color.

In response to a view mode of the content list not being set to a group mode by the user (S1130-N), the display apparatus 100 does not arrange a plurality of contents by the type of contents and terminates the operation.

A program code to perform the method for controlling a display apparatus according to the various exemplary embodiments may be stored in a non-transitory computer readable medium. The non-transitory recordable medium refers to a medium which may store data semi-permanently rather than storing data for a short time such as a register, a cache, and a memory and may be readable by an apparatus. Specifically, the above-described various applications or programs may be stored in non-transitory readable medium such as a CD, DVD, hard disk, Blu-ray disk, USB, memory card, ROM, etc. .

The foregoing embodiments and aspects are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method for controlling a display apparatus, the method comprising:
    storing at least one content selected by a user;
    displaying a content list including the at least one content; and
    in response to a location fixation command related to one of the at least one content included in the content list being input, fixing a location of the selected at least one content from among existing content included in the content list, and changing a location of remaining content from among the existing content of the content list.

2. The method as claimed in claim 1, wherein the fixing the location of the selected at least one content comprises:
    in response to the at least one content being pressed via the input of the user for a predetermined time, displaying a setting menu regarding the at least one content; and
    after displaying the setting menu, receiving a location fixation command by selecting a location fixation icon included in the setting menu.

3. The method as claimed in claim 2, wherein the setting menu includes a plurality of control command icons related to the at least one content,
    wherein the plurality of control commands include a location fixation command icon to fix a location related to one of the at least one content included in the content list.

4. The method as claimed in claim 1, wherein the location fixation command is input through at least one from among a user motion, a selection of an icon, and a user voice.

5. The method as claimed in claim 1, further comprising:
    in response to new content being added in the content list after the location fixation command is input, fixing a location of the at least one content for which the location fixation command is input from among existing content included in the content list, and changing a location of remaining content from among the existing content or deleting the remaining content from the content list.

6. A display apparatus, comprising:
    a display configured to display a content list including at least one content;
    an input part configured to receive a location fixation command; and
    a controller configured to, in response to a location fixation command related to one from among the at least one content included in the content list being input, fix a location of the selected at least one content from among existing content included in the content list and changing a location of remaining content from among the existing content of the content list.

7. The apparatus as claimed in claim 6, wherein the controller, in response to the at least one content being pressed via the input of a user for a predetermined time, controls the display to display a setting menu related to the at least one content,
    wherein the controller, in response to a location fixation icon being selected through the input part after the setting menu is displayed, fixes a location of the selected icon.

8. The apparatus as claimed in claim 7, wherein the setting menu includes a plurality of control command icons related to the at least one content,
    wherein the plurality of control commands include a location fixation command icon to fix a location related to one of the at least one content included in the content list.

9. The apparatus as claimed in claim 6, wherein the location fixation command is input through at least one from among a user motion, a selection of icon, and a user voice.

10. The apparatus as claimed in claim 6, wherein the controller, in response to a new content being added in the content list after the location fixation command is input, fixes a location of the at least one content for which the location fixation command is input from among existing content included in the content list, and changes a location of remaining content from among the existing content or deletes the remaining content from the content list.

11. The display apparatus as claimed in claim 6, further comprising a storage configured to store the at least one content selected by a user.

12. A method for controlling a display apparatus, comprising:
receiving a user command to display a content list including a plurality of contents; and
displaying the content list including the plurality of contents,
wherein the displaying comprises, in response to a first mode of the content list being set to a second mode by a user, arranging and displaying the plurality of contents according to a type of contents,
in response to a location fixation command related to one of the at least one content included in the content list being input, fixing a location of the selected at least one content from among existing content included in the content list, and changing a location of remaining content from among the existing content of the content list.

13. The method as claimed in claim 12, wherein the displaying comprises, in response to arranging and displaying the plurality of contents by the type of contents, determining the type of the plurality of contents according to an input of the user.

14. The method as claimed in claim 12, wherein the displaying the plurality of contents by the type of contents includes displaying the plurality of contents to be visually distinctive from each other using at least one from among size, form, shape, and color.

15. A display apparatus, comprising:
a display configured to display a content list including a plurality of contents;
an input part configured to receive a user command to set a first mode of the content list to a second mode; and
a controller, in response to the first mode of the content list being set to the second mode through the input part, controls the display to arrange and display the plurality of contents by a type of contents,
wherein the controller is configured to, in response to a location fixation command related to one from among the at least one content included in the content list being input, fix a location of the selected at least one content from among existing content included in the content list and change a location of remaining content from among the existing content of the content list.

16. The apparatus as claimed in claim 15, wherein the controller, in response to determining the type of the plurality of contents according to an input of the user, controls the display to display the plurality of groups to be visually distinctive from each other.

17. The apparatus as claimed in claim 15, wherein the displaying the plurality of contents by the type of contents includes displaying the plurality of contents to be visually distinctive from each other using at least one from among size, form, shape, and color.

* * * * *